United States Patent Office 3,533,917
Patented Oct. 13, 1970

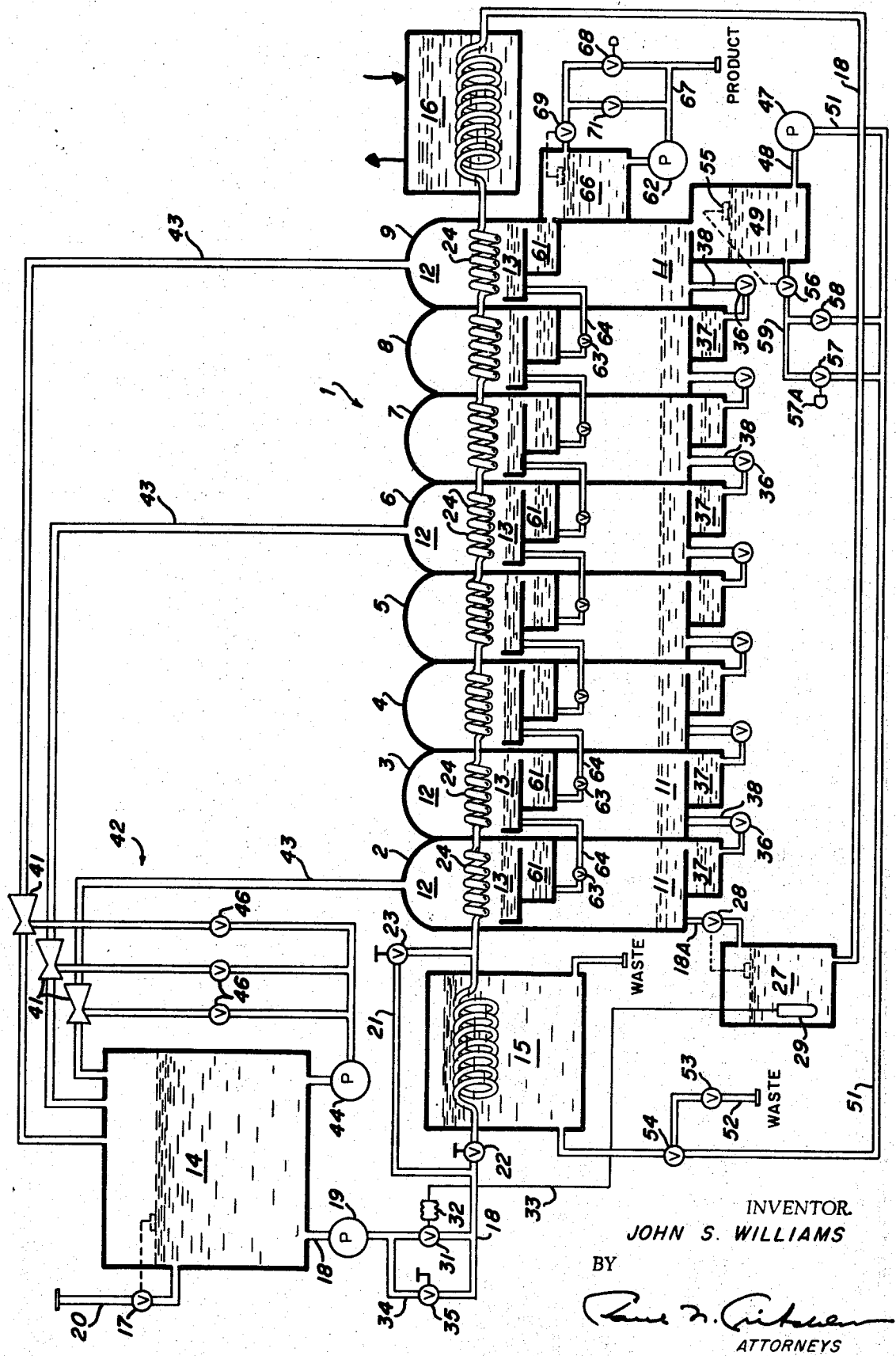

3,533,917
HYDRAULICALLY-CONTROLLED MULTISTAGE FLASH APPARATUS
John S. Williams, Newbury Park, Calif., assignor to the United States of America as represented by the Secretary of the Navy
Filed Sept. 18, 1968, Ser. No. 760,492
Int. Cl. B01d 3/06; C02b 1/06
U.S. Cl. 202—173                      7 Claims

ABSTRACT OF THE DISCLOSURE

The apparatus includes a feed tank providing a reservoir for feed water, such as sea water, a multi-stage evaporator, a feed water heater and ducts for conducting feed water from the feed tank through the multistage evaporator and the heater into the first stage of the evaporator. With exceptions to be noted, the multistage evaporator is somewhat conventional having an upper condensing section and a sump or well portion at the bottom of its evaporating chambers. The feed water duct passes successively through the condensing section of each of the evaporator chambers to promote condensation. Most suitably, the heater employs waste heat from diesel electric generators or other similar sources, such waste heat providing a temperature source for heating the feed water, the source producing variable temperatures the variability of which is dependent upon the loading of the generator which, in turn, varies the available amount of waste feed water. A temperature-responsive flow control valve is coupled into the feed water duct. The temperature sensor may be a bulb disposed to control flow rate in accordance with temperature variations between the heater and first stage of the evaporator. To prevent passage of vapor from one stage to the next, all interstage conduits utilize float valves which open when covered with fluid and close when not so covered, such valves providing liquid vapor seals between the stages. A vacuum system for the evaporator is provided by forming a circuit leading from the feed water tank through water jet eductors of a venturi type and back into the feed water tank. Waste brine is pumped from the final stage and, to avoid pump cavitation and possible vacauum leakage, a pilot-controlled, reverse acting, diaphragm valve controls the pump action. Pilot control is achieved by a small float valve with discharge permitted only when the float valve closes the pilot valve to actuate the main valve motor diaphragm. A similar valve arrangement is employed for distillate discharge control.

---

The invention described herein may be manufactured and used by or for the Government of the United States of America for governmental purposes without the payment of any royalties thereon or therefor.

BACKGROUND OF THE INVENTION

The present invention relates to multistage flash evaporator systems and, in particular, to hydraulic controls for systems that employ variable temperature heating sources.

Multistage flash evaporators for the purification of brine or sea water are quite well known and the prior art contains a number of significant improvements either of a system type or in the system components and their controls. The systems, for the most part, conduct the brine at saturation pressures into a flash chamber that is maintained at a pressure slightly less than that of the incoming brine and, because the incoming brine is at saturation pressure, a portion flashes into steam. The steam free of salt and other foreign materials, condenses and the purified distillate or condensate is collected. Multistage systems employ a series of flash chambers, each successive chamber at a pressure slightly less than the preceding one, the condensate being formed in each chamber and passing to the next for eventual collection. Heating systems regulate the feed water temperature conducted into the first stage of the evaporator. Other special arrangements relating to vacuum and flow control also have contributed to the efficiency of the purification or distillation process.

As far as has been determined, existing evaporators are deficient in a number of regards including, for example, the fact that they provide only for a small range of heat input and, therefore, a small range of productive capacity. Further, a number of the evaporators are limited by the rate of flow of the brine which the unit can handle to the extent that the duct passages are designed to accept a particular flow which, if substantially reduced, results in vapor being able to travel from one stage to the next. Alternatively, excessively high flow results in a flooding of the stages due to insufficient interstage pressure to force the liquid through the ducts.

Another difficulty frequently experienced when pumps are used to discharge the waste or collect the condensate is that, when the pump discharge or collecting conduit is low, the pump tends to cavitate and may result in a loss of vacuum throughout the system.

Also, many systems are excessively large, heavy, complex and not of the wholly automatic type which can be permitted to operate unattended for relatively long periods of time. Of particular significance, few arrangements have been adapted to handle a widely varying heat source such, for example, as the waste coolant system of a diesel electric generator.

THE OBJECTS

It is therefore an object of the present invention to provide an automatically-controlled multistage flash evaporator system, the control being accomplished hydraulically.

Another object is to provide such a system which also is capable of utilizing a variable temperature energy source for heating its feed water.

Another important object is to provide a system in which the possibility of inter-stage transmission of vapor is substantially eliminated.

A further object is to provide apparatus for waste brine and distillate discharge, the pump systems used being so controlled as to practically eliminate the possibility of cavitation and loss of vacuum.

Yet another object is to provide a simplified manner of producing the necessary vacuum for the evaporator tanks.

Stll another object is to provide a system that achieves unusually precise temperature control and in which the flow rate is responsive to relatively wide temperature variations.

A further important object is to provide an unusually efficient system capable of utilizing waste heat.

Other objects such as size and weight reduction, simplification, etc. will become more apparent in the ensuing detailed description.

BRIEF SUMMARY OF THE INVENTION

Particular features of the invention include a feed water tank that may be supplied with brine or sea water, the tank being utilized for a double purpose to the extent that first, in the preferred form it provides a reservoir for feed water and, secondly, it can serve as a source of fluid for creating the vacuum needed in the evaporator. Most suitably, the vacuum is achieved by circulating feed water through a circuit including water jet eductors in the form of venturis and back into the tank, the low pressure of the venturis being applied to certain stages of the evaporator for creating the necessary low pressure in the flash chamber stages. A heater is provided to heat the brine or feed water, the heater, most suitable, utilizing the waste heat of another system, such for example, as a diesel electric generator. Because of the variable nature of the temperature of the waste heat, a temperature responsive means is provided to control the flow rate of the brine or the feed water through the duct system of the evaporator. This control can be provided by a temperature responsive sensor, such as a bulb, mounted between the heater and the first stage of the evaporator, the bulb having a pressure line coupled to a reverse-acting, motor diaphragm valve, that controls flow in the main feed water duct. Liquid vapor seals, preferably utilizing float valves, are disposed between all stages of the evaporator to insure inter-stage passage of only the liquid phase of the feed water and the condensate. A similar float valve system preferably controls a reverse-acting valve to control the pumps which effect the discharge of both the condensate and the waste feed water, this arrangement avoiding pump cavitation and possible loss of vocuum. Other features will become more apparent in the detailed description that is to follow.

BRIEF DESCRIPTION OF THE DRAWING

The invention is illustrated in the accompanying drawing in which the single figure, FIG. 1, is a diagrammatic side elevational view of the system showing the components in outline and also showing the feed water and condensate flow, as well as the controls for the flow.

DETAILED DESCRIPTION OF THE INVENTION

Referring to FIG. 1, the present system includes a multistage flash evaporator 1 formed by a plurality of stages of chambers, identified in the drawing by numerals 2–9, these stages being arranged in a side by side disposition to facilitate fluid passage one to the other. Each stage, in turn, is formed with what may be termed a sump or well section 11 and a condensate section 12, and each of the chambers also mounts in its upper portion a reservoir 13 to collect the condensate in a manner which will be described. These components, as well as others to be described, can be of any physical form or size consistent with principles well known in the flash evaporator art. Also, the arrangement of the components can be suited to particular conditions, it being understood that the structure and arrangement of FIG. 1 is diagrammatic and is employed only for illustrative purposes.

Other major components of the system include a feed water tank 14, a preheater 15 and a feed water heat exchanger 16. Feed water tank 14 may be supplied from any source, although it presently is intended to use sea water or brine conducted into the tank through duct 20. A system of baffles may be used to assist in disengaging air discharged from a jet eductor vacuum system that will be described subsequently. Float valve 17, controls the supply, the float being disposed in the tank to open or close the valve to maintain a constant liquid level within the tank. As is true of most of the hydraulic components to be described, float valve 17 may be of any standard form and they are obtainable from a number of commercial sources, although the size and operating characteristics of the components may have to be varied to suit particular design conditions. Such variations, however, are well within the engineering skill of this art.

A main feed water conduit 18, coupled to tank 14, is employed to conduct the feed water through evaporator 1 and heat exchanger 16 into sump portion 11 of the first stage of the evaporator, identified as chamber 2 in FIG. 1. A centrifugal pump 19 provides the motive power for circulating the feed water. Considering the feed water circuit in greater detail, it will be noted that it first passes through preheater 15 as a series of coils or a bundle of tubes such as are commonly used in heat-exchanger construction. Also, a line 21 is provided for bypassing the preheater and manually-operable valves 22 and 23 are employed to provide the desired control.

Main conduit 18 then leads into evaporator stages in which the conduit again is formed with suitable coils or the like providing condenser coils 24 on which the condensate ultimately forms. On leaving evaportaor 1, conduit 18 passes in a coil or bundle form through exchanger 16.

Finally, conduit 18 leads into sump portion 11 of first stage 2, although, prior to entering the first stage, the heated feed water flows into a special sump 27 containing a valve 28 and a temperature-sensing bulb 29, the latter forming a part of a flow control system to be described. Valve 28 is a regulating valve used to exert back-pressure on the feed water in the heater higher than the flash point of the water at its particular temperature. It controls the flow from sump 27 into the first stage of the evaporator, these two members being interconnected by a short duct 18a.

Bulb 29 disposed in special sump 27, is part of a flow control system adapted to regulate or modulate the flow of the feed water through the evaporator and through heater 16. In general, the flow control system is designed to maintain a desired temperature in the feed water admitted into the evaporator, and it is for this reason that it is connected between the heater and the first stage of the evaporator. As has been pointed out, the present system preferably utilizes a variable heat source, such as diesel electric generator waste coolant which may experience wide variations in the quantity of heat. Other heat sources also can be used, such as the exhaust gas from an internal combustion engine or a vapor-phase or boiling-condensing system.

Flow control is achieved by mounting a temperature-responsive regulating valve 31 in main conduit 18 preferably near pump 19. This valve, may be a bellows-operated, reverse-acting, double-ported model calibrated, by way of illustration, to function in a temperature range of from 150° F. to 210° F. The bellows, indicated by numeral 32, is coupled by a pressure line 33 to temperature-sensing bulb 29 which should be sized and located to provide a rapid response to temperature changes. If desired, two valves can be used in parallel and set a few degrees apart to provide more precise control. Functionally, as the temperature rises, valve 31 responsively is opened by an increase in pressure on bellows 32 to increase the flow rate of the feed water. Conversely, as the temperature drops, the valve closes. A bypass line 34 is employed with valve 31 and provided with a manually-operable control valve 35. In use, the temperature sensor might be set at 180° F. and, when so set, will not open valve 31 until that temperature is reached, bypass line 34 then being controlled by valve 35 to permit a certain flow rate, such as 5 g.p.m.

Another feature of the present system is the particular manner in which it assures against vapor travelling from one stage of the evaporator to the next. As already indicated, vapor may pass through any of the ducts when the flow rate is low. The present system uses special liquid vapor seals to limit inter-stage flow to liquids as opposed to vapor. Due to the use of these seals the system conduits can be designed to accept a maximum designed flow without concern about inter-stage transmission of vapor when the flow is reduced. Because the temperature excursions of the heater require substantial modulations of the feed water flow, such seals assume added significance.

These liquid vapor seals are provided by valves 36 which are mounted in sumps or well portions 37 of the tanks or chambers of the evaporator stages. Valves 36 control passage of feed water from one stage to the next, this passage being through short ducts 38 which are supplied through valves 36 and in designing the system it is desirable to make ducts 38 of adequate size to handle maximum anticipated flow. Valves 36 may be double-ported, balanced valves operated by a float mounted on a lever arm. Preferably, these valves should have a resistance which should not exceed .25 p.s.i. for the valves in the high pressure end of the evaporator and they should have tolerances at their valve seats of at least 90% their shut-off capability. The float can be in the form of a metal sphere or cube filled with a closed cell material capable of withstanding temperatures up to 250° F. The float arm may be pin-connected to the valve stem and pivot about a pin connected to the valve body. Such valves are in common use and should require no detailed description. Although, if desired, they can be specially designed.

Valves 36 are intended to modulate the level of water in each flash stage. More specifically, they are designed to maintain a water level in sumps 37 above the valve body and the valves open to permit passage of feed water liquid only when the water is at this level. If the level drops below the valve body due to a low flow rate or for other reasons, the valve closes since, it is during such a phase of the operation that vapor could be transmitted through short conduits 38 from one stage to the next.

The present flash evaporator operates in a conventional manner to the extent that the condensate or distillate formed on condenser coils 24 is produced by maintaining in a known manner particular temperature and pressure conditions within the evaporator stages. Consequently, these stages must be subjected to a vacuum or low pressure to promote condensation and the manner in which this vacuum is created provides another significant feature. Thus, the present apparatus employs a plurality of jet eductors 41 coupled into a recirculating duct circuit 42 leading out of and back into feed tank 14. Jet eductors 41 employ venturis which have their low pressure sides coupled by conduits 43 to stages or tanks 2, 6 and 9 of the evaporator. The number of jet eductors and the particular stages to which the eductors are coupled can be very varied to suit conditions, although it is preferable that one eductor be installed to remove non-condensible gases from the first stage and another to remove the non-condensible gases from the final stage. Power for forcing the feed water through the eductors is supplied by a centrifugal pump 44 and, most suitably, circuit 42 includes shut off valves 46 as well as condensers installed between each water jet eductor and the vent outlet of the evaporator.

A further feature of the present invention is the manner in which the waste feed water, as well as the condensate is delivered or discharged from the evaporator. First, with regard to the feed water discharge, it generally can be stated that it is conducted in such a manner as to essentially eliminate the possibility of pump cavitation and possible vacuum leakage from the evaporator system. Such leakage, as has already been described, occurs when the flow rate is low causing the pump discharge to be low. The present arrangement avoids cavitation by providing a system to throttle the pump during the low flow periods.

More specifically, as may be noted in FIG. 1, the waste-discharge system employs a centrifugal pump 47 coupled by short conduit 48 to a special sump or well 49 mounted to communicate with sump portion 11 of final stage 9 of the evaporator. The pump discharges feed water collected in sump 49 through a conduit 51 which, preferably passes into previously identified preheater 15 to provide the heat for this unit. Alternatively, a waste line 52 permits direct discharge and valves 53 and 54 provide the necessary control to accomplish one or the other flows. Preheater 15 is employed to raise the temperature of the feed water to accomplish a more efficient condensation in the evaporator. Since the temperature of the sea water is a variable, the temperature of the water in evaporator coils 24 may at times be quite low and, when this temperature is low the particular vacuum system utilizing jet eductors 41 may provide insufficient pressure reduction to accomplish the condensation. Preheater 14 then can be employed to raise the temperature of the water passing through coils 24.

Cavitation of pump 47 is eliminated essentially by utilizing a float 55, a pilot valve 56, a diaphragm motor valve 57 and a steady flow by-pass valve 58, diaphragm motor valve 57 being coupled to the output of pilot valve 56 by a duct 59 and valve 58 being coupled across discharge line 51 and duct 59. Valve 57 may be either single or double ported and it should be reverse-acting to the extent that actuating pressure on the valve diaphragm opens the valve allowing feed water to be pumped out.

A clear understanding of the discharge operation can perhaps be obtained by considering a particular example in which discharge valve 57 is sized to provide flow equal to 100% of the feed flow at a pump of discharge pressure of 10 p.s.i. As stated, the opening and closing of valve 57 is responsive to pressures on its diaphragm 57a, and the diaphragm pressure, in turn, is responsive to the opening and closing of pilot valve 56. Pilot valve 56 is pivotally pinned to small float 55 in such a manner that the valve closes when the water in sump 49 reaches a predetermined level. If the water level in the sump is too low to close valve 56, flow is through the by-pass line and valve 58 back into sump 49 at, for example, a flow rate of 1 to 3 g.p.m. When pilot valve 56 closes, flow in the by-pass line is interrupted causing a pressure build up on diaphragm 57a. This pressure activates discharge valve to allow the brine to be pumped out. Conversely, when discharge valve 57 is closed, its reverse action characteristic throttles the pump discharge and avoids pump cavitation.

The particular valves used in this discharge operation again are conventional in principle and operation although, as with other of the present hydraulic components, it may be desirable to engineer the valves to suit the particular system being installed. Preferably, main discharge valve 57 should be made of bronze with Monel trim. Also, the pilot valve float can be constructed and mounted in a manner similar to the floats of inter-stage flow control valves 36.

Condensed distillate collection and discharge is similar in most respects to the waste collection and discharge which already has been described. The distillate condenses on evaporator coils 24 and drops into previously-mentioned reservoirs 13 which are trough-like in form. The troughs, in turn, feed into small sumps 61 which when sufficiently full are pumped by a discharge pump 62 from stage to stage for eventual collection as the purified product.

Inter-stage flow control of the condensate is provided by self-actuating control valves 63 used to maintain the essential vapor seal between the stages at all flow rates that may be effected. Valves 63 are double ported balanced valves operated by a float (not shown) and their construction and operation can be the same as float controlled valves 36 except that the condensate valves should be smaller versions. Thus, valves 63 are so arranged and mounted that their floats cause the valves to open only when the level of the condensate is sufficient to cover the valve body so as to exclude vapor from their ducts 64.

Discharge control of the condensate is, as previously stated, a smaller copy of the waste discharge system. A sump 66 receives the condensate from the final stage and pump 62 discharges the sump through a product-collection line 67. A diaphragm-controlled main discharge valve 68 controls the discharge and its reverse action throttles the discharge of pump 62 to avoid pump cavitation. Further, in the manner already described, the collection system employs a float-controlled pilot valve 69 which closes when a certain water level is reached in sump 66 to block flow through by-pass valve 71 and cause pressure to be exerted on the diaphragm of main valve 68 to permit discharge through line or duct 67.

The operation of the system probably is apparent but can be summarized by considering a typical condition in which sea water is supplied at about 70° F. to the feed water tank and the energy for heater 16 is supplied by the coolant of diesel electric generator which may vary in temperature from around 150° F. to over 200° F. In the particular example under consideration it can be assumed that the waste heat in the coolant of the generator is being supplied at 200° F. Feed water at 70° F. is passed first through preheater 15, which, in turn, receives its heating capacity from the waste feed water of duct 51, this water being at about 100° F. The temperature of the feed water is raised to 75° F. in the preheater and applied to coil 24 of evaporator tank 9. Since coils 24 are heated by vapor flashed from the heated feed water delivered to the sumps of the tanks, the temperature of the feed water as delivered to heater 16 is raised to about 155° F. Heater 16 raises the temperature to 180° F. for delivery into the first stage of the evaporator.

The foregoing conditions, of course, are purely exemplary and are intended to represent a typical condition that may exist when the system is operating at design capacity. Under these conditions, flash evaporation is produced by maintaining a low-atmospheric pressure in the evaporator stages and, for this purpose, jet eductors 41 can be driven to produce a vacuum of at least 28" Hg in the final stage of the evaporator.

If such temperatures and pressures are maintained at a constant, the system will continue to operate at design capacity. However, because of the widely-varying temperatures in heater 16, it is necessary to vary the flow rate through the system to maintain proper temperatures in the evaporator stages. For example, if the temperature of the fluid supply of heater 16 should drop, the feed water supply to the evaporator first stage might drop to 170° F. rather than the desired 180° F. When this condition occurs, sensor 29 detects the change and shuts down valve 31 to reduce the flow rate sufficiently to regain the desired temperature.

Such a reduced flow rate is essential for proper operation of the system but it is accompanied by the undesirable possibility that a low flow-rate may permit vapor transmission in the inter-stage lines and other lines. Consequently, the inter-stage lines are provided with the liquid vapor seals provided by float valves 36 and 63 which open only when the liquid levels are high enough to assure inter-stage passage of only the liquid phase of the water.

Discharge of both the waste feed water and the condensate is achieved by pumps 47 and 62 which, in the manner previously explained, tend to cavitate with a resulting vacuum loss when the pump discharge is low. Accordingly, each of these discharges utilizes pilot controlled, diaphragm-type discharge valves to throttle the pump discharge and avoid cavitations. Both the feed water waste and the condensate product in the example under condensation, will have a temperature of about 100° F., which as stated can be utilized efficiently in preheater 15.

Particular advantages of the system include its ability to utilize waste heat as the energy for heating the feed water and its concomitant ability to adjust flow rates in accordance wtih temperature excursions of the waste heat as well as to avoid vapor transmission and pump cavitation when the flow rate is low. Another advantage is the simplified and effective use of the feed water circulation through jet eductors to produce the desired vacuum. Such a vacuum system eliminates the need for separate vacuum apparatus and thus reduces the size and cost of the system. Further, although the hydraulic components, such as the float valves are conventional the use and arrangements of these particular components simplifies the system and increases its efficiency and reliability.

I claim:
1. Hydraulically-controlled multi-stage feed-water flash evaporator apparatus having a variable heat input, the apparatus comprising:
   a series of adjacently-disposed tanks each having a sump section and a condensate section,
   a feed water source,
   a preheater,
   a feed water heat exchanger,
   means for coupling said exchanger to a variable temperature fluid heating source,
   main conduit means for circulating feed water successively through said preheater, said tanks and said heat exchanger for delivery into said sump section of a first stage tank of said series,
   means for reducing the atmospheric pressure of said tanks for promoting flash evaporation of said delivered feed water,
   feed water duct means intercommunicating the tank sumps for conducting said delivered feed water from tank to tank,
   feed water discharge means communicating a final stage tank with said preheater for applying the heat of said final stage water to said preheater prior to discharge,
   reservoir means disposed in each tank for collecting condensate resulting from said flash evaporation,
   condensate duct means intercommunicating the condensate sections of the tanks for conducting said condensate from tank to tank,
   condensate discharge means coupled to a final stage tank,
   means disposed between said heat-exchanger and said first stage tank for sensing the temperature of said feed water, and
   flow control valve means responsively coupled to said sensing means and operatively coupled into said main conduit means between said source and said preheater for varying the flow of said feed water in said main conduit means,
   whereby said flow through said main conduit can be varied in accordance with the variable temperature of said heat exchanger,
   said flow varying from a maximum permitted by the size of said main conduit to a minimum necessary for achieving a feed water delivery temperature capable of promoting flash evaporation.

2. The apparatus of claim 1 wherein said means for sensing the temperature of the feed water includes:
   a separate tank coupled into said main conduit means for receiving said heater feed water effluent,
   conduit means communicating said separate tank with the sump section of said first stage tank,
   a temperature sensor disposed in said separate tank, and
   said valve means of the flow control means includes:
      a diaphragm-controlled valve, and
      a pressure line coupled between said sensor and the diaphragm of said valve for driving said diaphragm and regulating its valve.

3. The apparatus of claim 1 wherein said feed water source includes a feed water tank and wherein said means for reducing the atmospheric pressure of the tanks includes:
   a plurality of recirculating duct circuits leading out of and back into said feed water tank,
   said circuits each including a jet eductor venturi means, and
   low pressure conduit means communicating the low side of said venturi means with certain of said flash evaporator series of tanks.

4. The apparatus of claim 1 wherein said feed water duct means includes:
   float valve means mounted in said sump sections for controlling the flow through said feed water duct means,
   said float valve means permitting flow from sump to sump only when the level of feed water in said sumps covers the valve means of said float valves,
   whereby vaporless passage of feed water liquid from sump to sump is obtained.

5. The apparatus of claim 1 wherein said reservoir means each is formed with a sump section,
  said condensate duct means intercommunicating said reservoir means,
  float valve means mounted in said sump sections of said reservoir means for controlling the flow through said condensate duct means, and
  said float valve means permitting flow from one reservoir means to another only when the level of condensate in its sump sections covers the valve means of said float valves,
  whereby vaporless passage of condensate liquid from one reservoir means to another is obtained.

6. The apparatus of claim 1 wherein said feed water discharge means includes a pump, said discharge means further including float-controlled valve means for controlling said pump for reducing the rate of discharge in conformity with the level of the feed water in the final tank of said series of tanks,
  whereby cavitation of said pump during low discharge flow rates is avoided.

7. The apparatus in claim 1 wherein said condensate discharge means includes a pump, said discharge means further including float-controlled valve means for controlling said pump for reducing the rate of discharge in conformity with the level of the feed water in the final tank of said series of tanks,
  whereby cavitation of said pump during low discharge flow rates is avoided.

References Cited

UNITED STATES PATENTS

| | | | |
|---|---|---|---|
| 2,908,618 | 10/1959 | Bethon | 203—11 XR |
| 3,219,553 | 11/1965 | Hughes | 202—173 |
| 3,399,118 | 8/1968 | Williamson | 202—173 |

WILBUR L. BASCOMB, JR., Primary Examiner

D. EDWARDS, Assistant Examiner

U.S. Cl. X.R.

202—181, 193, 205, 206, 235; 203—2, 11